United States Patent [19]

Woodhouse

[11] 3,928,155
[45] Dec. 23, 1975

[54] METHOD AND MEANS FOR PROMOTING CO-AGULATION OF PARTICLES IN A LIQUID

[76] Inventor: Derek A. Woodhouse, Burne House, Tittensor, Stoke-on-Trent, Staffordshire, England

[22] Filed: Jan. 3, 1973

[21] Appl. No.: 320,787

Related U.S. Application Data

[63] Continuation-in-part of Ser. No. 854,976, Sept. 3, 1969, abandoned.

[30] Foreign Application Priority Data

Sept. 20, 1968 United Kingdom............... 44775/68
June 10, 1969 United Kingdom............... 29204/69

[52] U.S. Cl. ................ 204/150; 204/148; 204/149; 204/197
[51] Int. Cl.² .......................................... C23F 13/00
[58] Field of Search ........... 204/149, 152, 150, 147, 204/148, 196, 197

[56] References Cited
UNITED STATES PATENTS

| | | | |
|---|---|---|---|
| 2,451,067 | 10/1948 | Butler | 204/248 |
| 2,607,725 | 8/1952 | Butler | 204/248 |
| 3,342,712 | 9/1967 | O'Keefe, Sr. | 204/148 |

OTHER PUBLICATIONS

Welder et al., "Practical Performance of Water-Conditioning Gadgets," Indust. and Engin. Chem., Vol. 46, No. 5, pp. 954–960 (May, 1954).
Eliassen et al., "'Miricale' Water Conditioners," Jrnl. Amer. Water Works Assoc., Vol. 50, No. 10, pp. 1371–1384 (Oct. 1958).
Nordell, "Water Treatment," 2nd Ed., Reinhold Publishing, N.Y., (1961), pp. 270–273.
Hurley et al., "Elec. Treat. of Boiler Feed Waters," Jrnl. Instit. of Water Engin.," 1951, 5, pp. 686, 689, 698, 699.
Editorial, Jrnl. of Electrochemical Society, "Gypping the Gullible," Vol. 100, No. 8, Aug. 1953, p. 209c.
James, "Water Treatment," 1965, pp. 166, 167.
Profs. Eliassen and Uhlig, "So–Called Elec. and Catal: Treat. of Water for Boilers," Jrnl. Amer. Water Works Assoc., 44, July, 1952, pp. 576–582.

Primary Examiner—John H. Mack
Assistant Examiner—A. C. Prescott
Attorney, Agent, or Firm—Alan H. Levine

[57] ABSTRACT

There is described a method and apparatus for treating liquids to promote coagulation of particles in the liquid by creating at a section of a supply conduit through which the particle-containing liquid flows, a self-induced e.m.f. using the liquid as an electrolyte to conduct between two different potentials, coupled through a resistance, ions of opposite and therefore attractive charge to the existing ions creating the Zeta potential in the electrical double layer at the liquid/particle interface, thereby disturbing the stability of the particles in suspension and initiating precipitation of the particles to form nuclei in the liquid contained in or passing through that section of the conduit.

6 Claims, 3 Drawing Figures

U.S. Patent   Dec. 23, 1975   Sheet 1 of 2   3,928,155
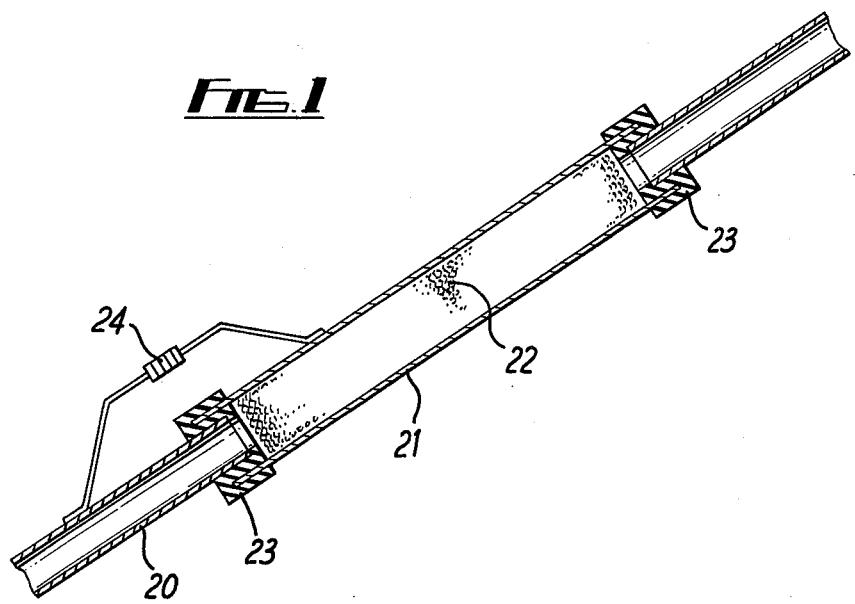

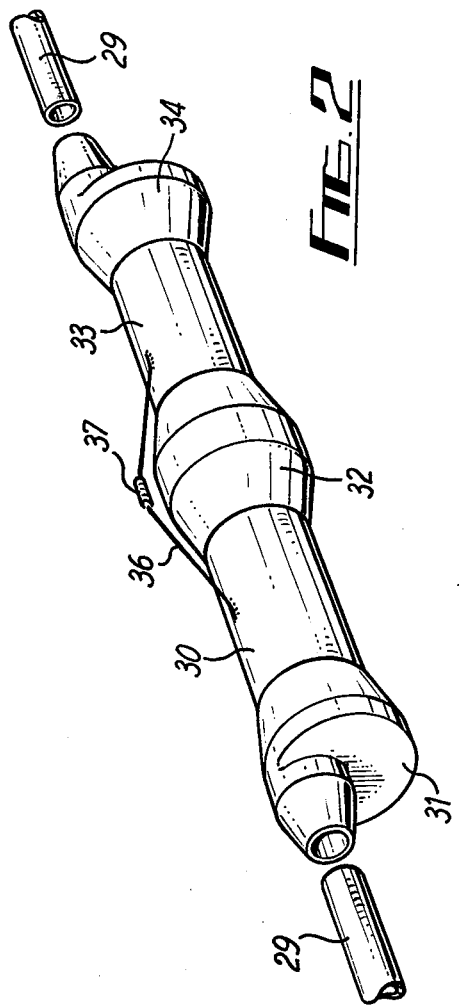
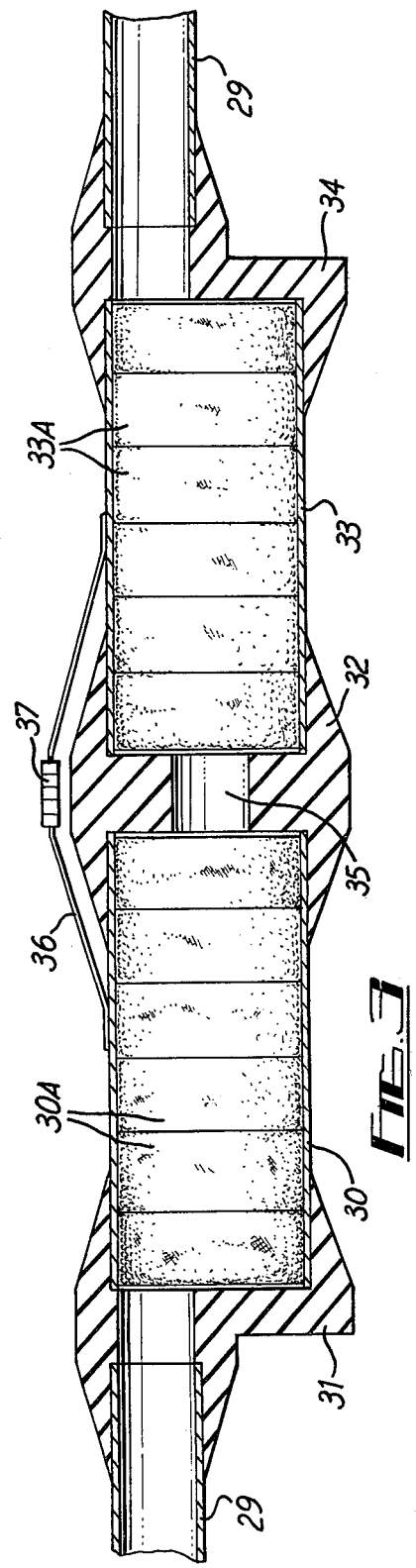

METHOD AND MEANS FOR PROMOTING CO-AGULATION OF PARTICLES IN A LIQUID

This application is a continuation-in-part of Ser. No. 854,976, filed Sept. 3, 1969, now abandoned.

The invention relates to a method and means for treating liquid to promote the coagulation of particles in the liquid in order to affect the accumulation of deposits of solid particles or scale in containers or on the inner walls of conduits in which the treated liquid is contained or through which the liquid is flowing, or at least to retard or reduce such tendencies.

The formation of scale in, for example, domestic water systems arises mainly from the conversion of soluble bicarbonate into insoluble carbonates and this usually takes place on a surface. The initial deposit of carbonate starts as minute embryonic crystals or nuclei which grow to produce utlimately the scale. It is known that the presence of magnetic or electric fields affects the formation of crystals and precipitates and their subsequent behaviour. The effects are believed to be due to changes in the electrical double layer at the interface between particles in the liquid and the liquid itself.

At the interface of every phase boundary there exists an electrical potential difference. This arises from the so-called electrical double layer whose origin lies in the absorption at the interface of ions and polar molecules which produces an inner layer and an outer diffuse layer. Between the two is a plane of slip known as the Zeta potential. Ions affect this potential by changing the charge distribution within the double layer. A double layer of this kind exists around particles of impurities in a liquid, and under normal conditions a state of electrical balance or stability exists. The Zeta potential at the interface between the liquid and the colloid or other particles or ions in it, has been found to be of paramount importance to the stability referred to, and changes in the Zeta potential affect crystal formation. Attempts have previously been made to produce such changes by the application of externally generated electrical fields, but these have suffered from the disadvantage that the need to make external electrical connections is costly, time-consuming and not always convenient.

The beneficial results of the present invention stem from an appreciation that the formation and behaviour of the particles and the like might be influenced by a self-induced e.m.f. instead of one generated externally. Thus by virtue of the invention a self-induced e.m.f. is created, the effect of which is to alter the Zeta potential in the electrical double layer around the particles of impurity carried along by the liquid. This affects the behaviour of the particles in promoting coagulation in the liquid such that when liquid which has been treated by the method and apparatus of the invention is subsequently heated substantial changes in the extent and nature of the scale or the like which is formed take place.

The invention provides a method of treating a liquid to promote coagulation of particles in the liquid, the method comprising creating at a section of a supply conduit through which the liquid flows, a self-induced e.m.f. effective to alter the Zeta potential of particles and ions present in the liquid contained in or passing through that section of the conduit.

The invention also provides a device for insertion into a conduit to promote coagulation of particles in a liquid flowing through the conduit, the device consisting of or including a section of tube of an electrically-conducting material different from that of the conduit and fitted with electrically insulating end connectors, the section of tube containing an element of the same material as the tube and effective to present a large surface area to the liquid, and the section of tube being connected in or adapted to be connected in an external electrical circuit bridging one of said end connectors and containing a resistance.

The device may consist solely of the section of tube referred to, the electrical connection then being made between the section of tube and the conduit itself. Alternatively the device may include a further section of tube of an electrically conducting material different from that of the first mentioned section, the further section being connected to said first section by one of said electrically insulating end connectors and being provided with a further end connector at its opposite end for engagement with the conduit, said electrical circuit bridging the central one of said connectors to interconnect the two sections of different electrically-conducting materials. This produces a self-contained device insertable into a pipe without requiring any electrical connection to the pipe itself and suitable for use with plastic as well as metal piping systems.

Embodiments of the invention will now be described, by way of example only, with reference to the accompanying drawings, in which:

FIG. 1 is a cross-section through one form of device according to the invention;

FIG. 2 is a perspective view of an alternative form of device; and

FIG. 3 is a cross-section through the device shown in FIG. 2.

Referring to FIG. 1, a section of a copper pipe 20 is removed and replaced by a larger diameter stainless steel tube 21 filled with coiled and twisted stainless steel wire 22. The copper pipe 20 may, for example, be half an inch in internal diameter and the tube 21 three quarters of an inch internal diameter. Electrically insulating end connectors 23 connect the parts together, and the pipe 20 and tube 21 are connected in an external electrical circuit which contains a resistance 24. The purpose of this resistance is to limit the electrical current which flows as a result of the difference in potentials of pipe 20, tube 21 and wire 22, thereby maintaining these electrical potentials and also limiting the risk of corrosion.

When liquid is present in or flows through the pipe an electrical potential is induced at the interface between the liquid and the copper pipe 20 and a different potential is induced at the interfaces of the liquid and the stainless steel tube 21 and the liquid and stainless steel wire 22. The different potentials are due to the different material interfaces and the result is the creation of an electric field in the liquid such that coagulation and precipitation of the colloid or other particles and ions occurs. The effect is to control the accumulation of deposits of solid particles of scale in containers or on the inner walls of pipes when the treated liquid is heated, or at least to retard or reduce such tendencies.

It should be noted that the pipe 20 may be stainless steel and the tube 21 and wire 22 may be copper. Other metal combinations may also be used with the proviso that they are close on the Galvanic Scale so that the possibility of corrosion through electrolytic action is minimal.

FIGS. 2 and 3 show an alternative form of device which is self contained in the sense that electrical connection to the pipe itself is not required. The device consists of a section 30 of copper tube, which will generally be of larger diameter than the pipe into which the device is to be inserted, and is fitted at one end with an end connector 31 made from electrically insulating material and adapted for connection to a pipe 29. At its other end the tube 30 is connected by means of an electrically insulating intermediate connector 32 to one end of a similar section of tube 33 made from stainless steel. The other end of the section 33 is provided with an end connector 34 similar to the end connector 31.

As best seen in FIG. 3, the section of tube 30 is filled with a number of disc-like plugs 30A formed from twisted copper wire which contact the inner surface of the tube at multiple points and also present a large surface area to liquid passing through the device. The section of stainless steel tube 33 is filled with a similar series of plugs 33A formed from twisted stainless steel wire. A passage 35 is formed in the central insulator 32 such that liquid may flow through the device from one end to the other. The outer surfaces of the tube sections 30 and 33 are interconnected by a wire 36 incorporating a resistor 37.

In operation, the device is inserted into a supply conduit of, for example, a water system. As the tubes 30 and 33 and their respective twisted wire elements are formed from different metals, a potential difference exists between them due to their different positions on the Galvanic Scale. When liquid passes through the device it forms a conducting path allowing current to flow round the circuit formed by wire 36. The liquid passing through the device is therefore subjected to a self-induced e.m.f. generated by virtue of the construction of the device and this affects the Zeta potential of the suspended particles in the liquid in the manner referred to above.

It should be appreciated that the precise manner in which the mechanism of the present invention operates is not fully understood. It is clear however that the self-induced e.m.f. alters the Zeta potential in the electrical double layer round the particles suspended in the liquid, and this is believed to initiate the formation of a quantity of embryonic crystals or nuclei in the liquid at the region of application of the device to the pipe. These embryonic crystals or nuclei are then swept along by the flow of the liquid and when the liquid enters a boiler, pipe or container they form the nuclei for further growth of insoluble carbonate and other impurities. Thus as well as forming on the surfaces of the pipe, container or the like, the carbonate crystals form round the suspended nuclei and present large surface areas in the liquid. The total amount of crystal growth is thought to remain the same as in untreated liquid, but as a substantial proportion is in the form of suspended precipitate carried in the liquid it is withdrawn from the system with the liquid and as a result the scale formed on the internal surfaces of the system is reduced.

Thus by inserting devices of the kind described in a supply pipe, they are found to induce coagulation of the colloid or other particles and ions in the liquid. When hard water is treated in this way the tendency to form scale deposits on the inner surfaces of conduits and containers is reduced. It is anticipated that when used on small to medium sized domestic water supply systems a single device fitted to the lead-in pipe will be effective throughout the system. Extra devices may however be required in some cases. Similarly inhibited are gels, for example in fuel oil, which adversely affect the liquid when used or when conveyed in conduits or containers.

It will be appreciated that the devices described are very simple and inexpensive as they achieve the desired results without the need to apply external voltages. Moreover while the device shown in FIG. 1 requires an external electrical connection to be made to the pipe itself, the device shown in FIGS. 2 and 3 is entirely self-contained and requires no external connection of this kind. Installation of the latter device is therefore a simple matter requiring only that opposite ends of the device be connected to the supply pipe or the like.

I claim:

1. A method of treating a liquid to promote coagulation of particles in the water containing scale forming hardness factors, comprising the steps of:
   a. providing two tubes made of two different electrically-conductive materials having different positions on the Galvanic Scale,
   b. providing a connector member made of insulator material,
   c. interconnecting the tubes in series by means of the connector so that liquid flowing through the tubes flows first through one of the tubes and then through the other,
   d. electrically connecting the two tubes together by means which is not engaged by liquid flowing through the tubes, and
   e. causing such water to flow through the tubes.

2. A method as defined in claim 1 wherein said electrical connection means includes a resistor.

3. A method as defined in claim 1 wherein one of said tubes is copper and the other stainless steel.

4. A method as defined in claim 1 including filling at least one of said tubes with an element effective to present a large surface area made of the same material as the material of that tube prior to causing water to flow through the tubes.

5. A method as defined in claim 4 wherein said element comprises coiled or twisted wire.

6. A method as defined in claim 4 wherein said at least one tube is of larger internal diameter than the other tube.

* * * * *